United States Patent [19]

Yamamoto

[11] Patent Number: 4,904,912
[45] Date of Patent: Feb. 27, 1990

[54] CONTROL MECHANISM EMPLOYING INTERNAL MODEL COORDINATION FEEDFORWARD METHOD

[76] Inventor: Nobuo Yamamoto, Mukainodanchi, 2917-111, Mawatari-shi, Ibaraki 312, Katsuta, Japan

[21] Appl. No.: 254,273

[22] Filed: Oct. 6, 1988

[30] Foreign Application Priority Data

Oct. 9, 1987 [JP] Japan .................................. 62-253768

[51] Int. Cl.$^4$ ............................................. G05B 13/00
[52] U.S. Cl. ................................... 318/561; 318/618; 318/621; 364/149; 364/150; 364/165
[58] Field of Search ........................ 318/561, 618, 621; 364/149, 150, 165

[56] References Cited

U.S. PATENT DOCUMENTS 3,758,762  9/1973  Littman et al. .................. 318/561 X
4,679,136  7/1987  Shigemasa ........................... 364/150

OTHER PUBLICATIONS

"The Multivariable Servomechanism Problem from the Input–Output Viewpoint", Bruce A. Francis, IEEE Trans. Automatic Control, vol. AC-22, No. 3, Jun. 1977, pp. 322–328.

Primary Examiner—William M. Shoop, Jr.
Assistant Examiner—Saul M. Bergmann
Attorney, Agent, or Firm—Antonelli, Terry & Wands

[57] ABSTRACT

A control mechanism employing an internal model coordination method according to the present invention is arranged to obtain a manipulation variable by comparing a desired value or a reference value with a feedback variable into which a controlled variable is transformed to provide an error, sequentially transmitting the error to an internal model which is composed of the same number of elements as its order, adding the outputs of a plurality of gain controllers into which the state variables of the respective elements are input, and comparing the result of the addition with another feedback variable supplied from a conventional regulator. The control mechanism is characterized by a new regulator arranged to receive as its input a branched signal of the desired value or the reference value and a path arranged to cause a signal obtained by addition of the output of the new regulator to the final state variable of the internal model to be input to a corresponding one of the gain controllers.

7 Claims, 7 Drawing Sheets

RAMP RESPONSE : r(t) = 0.2 t
STEP DISTURBANCE : d(t) = 1.0 (t > 8)
SAMPLE TIME : T = 1

RAMP RESPONSE : r(t) = 0.2 t
STEP DISTURBANCE : d(t) = 1.0 (t > 8)
SAMPLE TIME : T = 1

RAMP RESPONSE : r(t) = 0.2 t
STEP DISTURBANCE : d(t) = 1.0 (t > 8)
SAMPLE TIME : T = 1

CONTROL MECHANISM EMPLOYING INTERNAL MODEL COORDINATION FEEDFORWARD METHOD

BACKGROUND OF THE INVENTION

1. Field of the Invention

The present invention relates generally to control mechanisms and, more particularly, to a servo-mechanism employing an internal model coordination feedforward method.

2. Description of the Prior Art

In control mechanisms, particularly servo-mechanisms, it is indispensable to utilize an internal model principle in order to improve the capability of a controlled value to follow up a desired value or a reference value and to eliminate any steady state error as well as to reduce the influence of disturbances upon the controlled variable, thereby, for example, eliminating steady state errors due to disturbances. (Refer to B. A. Francis, The Multivariable Servo Mechanism Problem from the Input-Output Viewpoint, IEEE Trans. Automatic Control, AC-22-3,322/328 (1977).) Deadbeat control, optimal control, adaptive control, repetitive control and the like are known as typical control methods. Each of these control methods has a different feature, and is applied to suitable portions of various control mechanisms to achieve the objects thereof. Also, a general-purpose and standard method of setting controllers and regulators in each of these control mechanisms which involves the utilization of the internal model principle is regarded as having been substantially established, and it is deemed that the designs of many kinds of control mechanisms, particularly designs based on current control theories, have started with the above-described established method. Also, control mechanisms utilizing feedforward systems are widely used, and they are applied to individual systems in a suitable applied form. In addition, a new method is proposed. (Refer to, for example, Jiaqing Wang and Takeshi Tsuchiya, Minimal Order Output Feedback Control System Design Method with Feedforward Control Loops and its Application, the transaction of the institute of electrical engineers of Japan, Paper C, Volume 105, No. 5, 93/100, 1985.)

However, the history of development of current control theories is relatively new, and it is relatively recently that they have been applied to actual control mechanisms owing to improvements in the performance of various kinds of computers and the miniaturization thereof as well as an increased diffusion of computers as a result of a reduction in price.

Current control mechanisms including internal models comprise, in addition to regulators responsible for feedback of the state variables of controlled systems, gain controllers which are set similar to the regulators so as to receive the state variables of the respective internal models as new state variables. Thus, the current control mechanisms are constructed to produce a manipulation variable as an amplified corollary of the state variables, thereby enabling satisfactory control. However, since the constituent elements of many of the internal models are integrators or similar devices, there is still the problem in terms of the quickness of response with respect to abrupt changes in a desired value or a reference value. However, it does not seem that a general-purpose method which can solve such a problem, and which is one development of the prior art methods of setting controllers and regulators, has been intensively studied.

There is a possibility that new, superior and general-purpose methods can be found as one development of such prior art methods, and it is considered that a further improvement should be pursued through the improvement of the quickness and dispersibility of response, reductions in manipulation variables and the lessening of the influence of disturbance. To this end, it has been proposed to provide one method utilizing feedforward (refer to the above document). However, this proposal has been made as a "by-product" of difficult theoretical analyses, and therefore the resultant systems are difficult to achieve because of their complicated constructions. In a situation in which each form of feedforward must be utilized for a different kind of control, no general-purpose method has been proposed.

SUMMARY OF THE INVENTION

It is, therefore, an object of the present invention to provide a control mechanism employing an internal model coordination feedforward method which can overcome the above-described problem by means of a feedforward arrangement which coordinates with internal models, thereby markedly improving the quickness of response while retaining various other kinds of performance such as a disturbance characteristic.

It is another object of the present invention to provide a control mechanism employing an internal model coordination feedforward method which is easy to design and construct.

To achieve the above and other objects, in accordance with one aspect of the present invention, there is provided a control mechanism arranged to obtain a manipulation variable by comparing a desired value or a reference value with a feedback variable into which a controlled variable is transformed to provide an error, sequentially transmitting the error to an internal model which is composed of the same number of elements as its order, adding the outputs of a plurality of gain controllers into which the state variables of the respective elements are input, and comparing the result of the addition with another feedback variable supplied from a conventional regulator. The control mechanism is characterized by a new regulator arranged to receive as its input a branched signal of the desired value or the reference value and a path arranged to cause a signal obtained by addition of the output of the new regulator to the final state variable of the internal model to be input to a corresponding one of the gain controllers.

In accordance with a second aspect of the present invention, there is provided a control mechanism characterized by a plurality of new regulators arranged to respectively receive as their inputs a plurality of branched signals of an error; a plurality of paths arranged to sequentially add the outputs of the plurality of new regulators to the state variables of the respective elements which serve as an internal model; an additional new regulator arranged to receive as its input a branched signal of the desired value or the reference value; and an additional path arranged to cause a signal obtained by addition of the output of the additional new regulator to the final state variable of the internal model to be input to a corresponding one of the gain controllers.

First, the present invention will be diagrammatically described below with reference to FIG. 1 which is a schematic block diagram illustrating the principle of the invention. FIG. 1 shows in block diagram form the basic construction of the control mechanism according to the present invention. In this figure, reference numeral 1 represents a desired value or a reference value; 2 a comparator; 3 an error; 4 elements, such as integrators or similar devices, which each serve as an internal model; 5 branch points; 6 a final state variable of the internal model; 13, 14 conventional gain controllers; 15 adders; 16 a subtracter; 17 a manipulation variable; 18 a feedback variable which is supplied from a conventional regulator; and 19 a feedback variable into which a controlled variable is transformed. These elements are standard constituent elements which are typically employed in conventional control mechanisms.

A regulator according to the present invention is constituted by elements 7 to 12. Reference numerals 7 and 8 represent branch points, and reference numerals 9 and 10 represent regulators which are newly provided according to the present invention. (The regulators which are newly incorporated according to the present invention are hereinafter referred to as "new regulators" in order to distinguish such regulators from the regulators which are incorporated in conventional control mechanism.) Reference numerals 11 and 12 represent adders.

Regarding the transformation of the block diagram relative to the new regulators of the present invention, there is a point to notice. The branch point 8 subsequent to the error 3 may be provided in place of the branch point 7. In this case, if the values of the respective elements of the factor matrix F $\Delta(f_1, f_2, \ldots, \text{and } f_n)$ of the conventional regulator is changed, it is possible to obtain a block diagram equivalent to that before transformation. It is to be noted that, if an internal model of a type 1 system is used, the construction of the control mechanism is transformed into a construction similar to that of a PI indicating and/or recording controller as a result of the former modification. However, the thus-transformed control mechanism does not function as such a controller since the method of setting the factor of each new regulator according to the present invention basically differs from a setting method for a conventional type of PI indicating and/or recording controllers.

The function of the present invention will next be described below.

The control mechanism which employs an internal model in accordance with the present invention comprises, in addition to the gain controllers 13, 14 and the conventional regulator, the new regulator 9 which is set between the branch point 7 and the gain controller 14. Therefore, an abrupt change in the desired or reference value 1 is allowed to bypass each of the elements. Furthermore, the provision of the new regulators 10 enables the error 3 to bypass the corresponding elements 4 which each serve as an internal model, thereby solving the problem that, when the desired or reference value 1 changes, a time lag may take place due to the operating characteristics of the internal model 4. Accordingly, it is possible to solve the problem of a time lag due to the internal model 4 with respect to a change in the desired or reference value 1 and to achieve a marked improvement in the quickness of response without the need to decrease the order of the internal model 4, while retaining a disturbance characteristic at a level similar to that of the prior art method and realizing a reduction in a manipulation variable.

With the present inventive control mechanism employing an internal model coordination feedforward method which is constructed and functions as described above, it is possible to markedly improve the quickness of response of a control mechanism, particularly a servo-mechanism while retaining various other characteristics such as a disturbance characteristic. In addition, in accordance with the present invention, it is possible to provide a control mechanism which can be used as a standard or general-purpose mechanism in combination with a conventional type of controller and regulator and which employs an internal model coordination feedforward method which is easy to design and construct.

BRIEF DESCRIPTION OF THE DRAWINGS

The present invention will be understood by reference to the following detailed description and the accompanying drawings, wherein.

DESCRIPTION OF THE PREFERRED EMBODIMENTS

A description will be made with reference to three embodiments; a first embodiment which utilizes deadbeat control employing an internal model of a type 1 system, a second embodiment which utilizes optimal control employing an internal model of a type 1 system, and a third embodiment which utilizes deadbeat control employing an internal model of a type 2 system.

In each of the three embodiments, it is assumed that the transfer function of a controlled system is represented by:

$$G(s) = \frac{0.2}{s(s^2 + 0.5s + 0.5)} \quad (1)$$

and that all the state variables of the controlled system can be measured. Also, it is assumed that the feedback element of each of the three embodiment is constituted by a direct-coupling feedback system represented by:

$$H(s) = 1 \quad (2)$$

Embodiment 1

Figure 1:
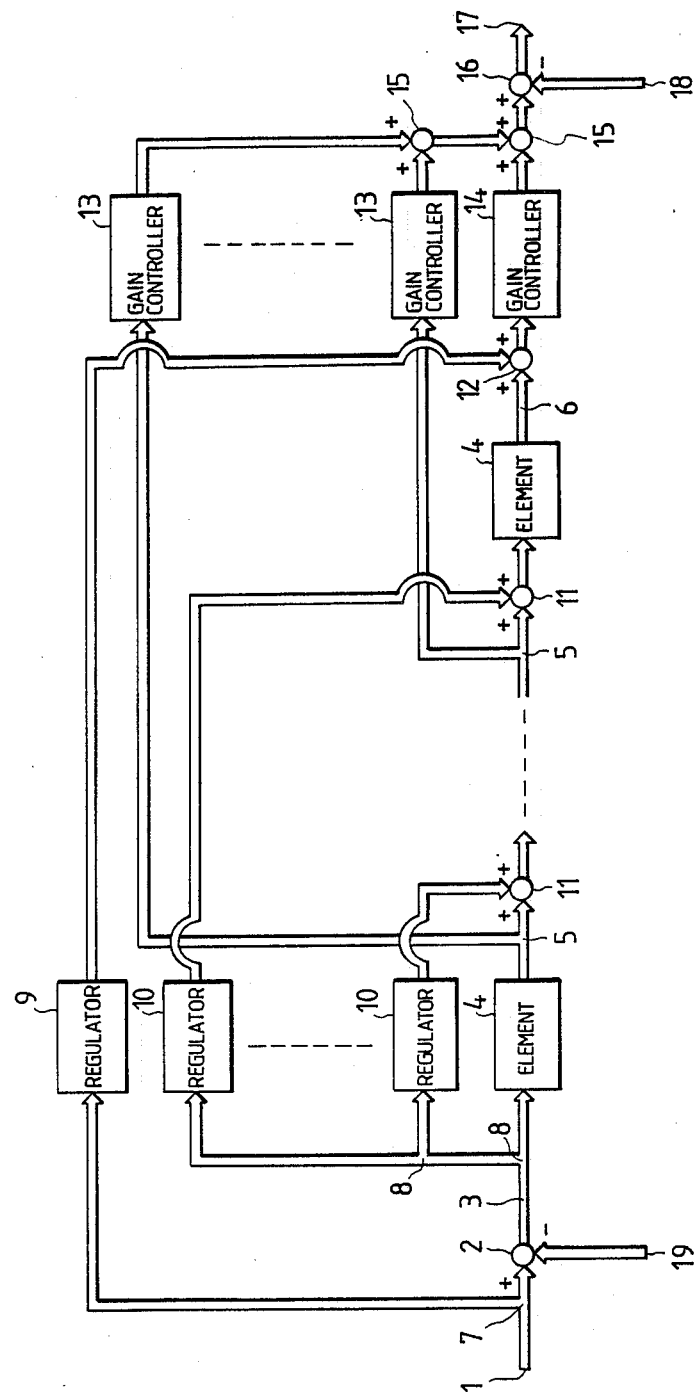
FIG. 1 is a block diagram showing the basic construction of a control mechanism which employs an internal model coordination feedforward method in accordance with the present invention.
Figure 2:
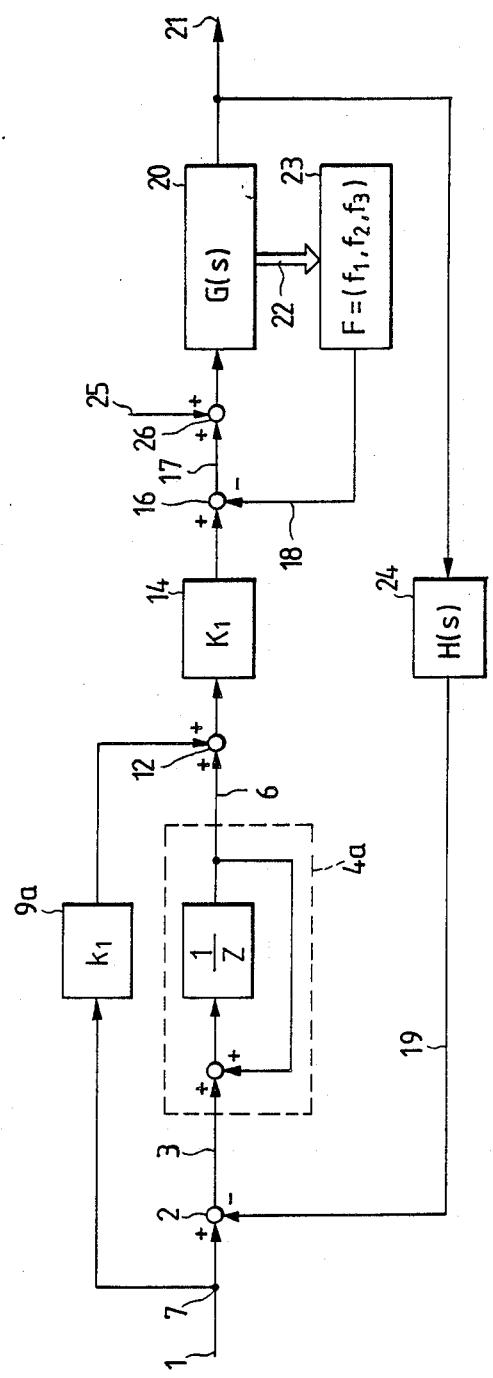
FIG. 2 is a block diagram which serves to illustrate control mechanisms according to first and second embodiments.

FIG. 2 is a block diagram of the first embodiment in which a new regulator is provided for digital control utilizing the internal model coordination feedforward method according to the present invention, and the first embodiment adopts a deadbeat control mechanism which employs a type 1 internal model. In FIG. 2 in which the same elements as those shown in FIG. 1 are identified by the same reference numerals, reference numeral 4a denotes an element such as a single integrator or similar device which serves as an internal model; 9a a new regulator; 20 a controlled system; 21 a controlled variable; 22 a state variable; 23 a conventional regulator; 24 a feedback element; 25 a disturbance; and 26 an adder. In FIG. 2, an A/D conversion (sample and hold) element and a D/A conversion element are omitted for the sake of simplicity. Also, it is assumed that the desired or reference value 1 is represented by the following unit step function:

$$r(t) = \begin{cases} 0 & (t < 0) \\ 1 & (t \geq 0) \end{cases} \quad (3)$$

and that the disturbance 25 is a unit step disturbance which occurs during a time period of $t \geq 6$, which disturbance is represented by:

$$d(t) = \begin{cases} 0 & (t < 6) \\ 1 & (t \geq 6) \end{cases} \quad (4)$$

The gain controller 14 ($K_1$) and the regulator 23 ($F = (f_1, f_2$ and $f_3)$) which are combined to provide deadbeat control are selected in a manner identical to a known method, and the values $K_1$ and $F$ can be determined independently of the value $k_1$ of the new regulator 9a. Also, theoretically, the value $k_1$ can be arbitrarily selected. This is one feature of the present invention.

Figure 3:
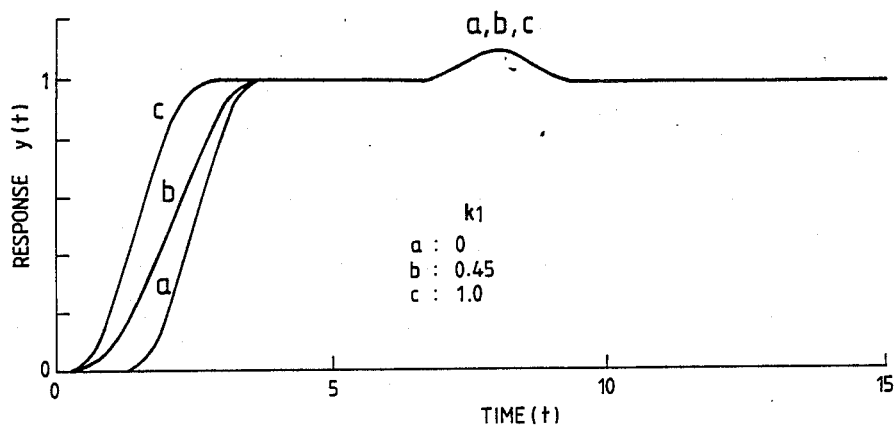
FIG. 3 is a diagram showing step responses according to the first embodiment in contrast to that of a prior art method, each of the step responses containing a step disturbance of a controlled variable y(t)

FIG. 3 shows step responses each containing a step disturbance of the controlled variable 21 (y(t)) when a sample time is T=1, and the horizontal and vertical axes represent time (t) and response y(t), respectively. Curve a represents the response of prior art deadbeat control (corresponding to $k_1 = 0$), and curves b and c represent the responses of deadbeat control according to the present invention when the values $k_1$ of the new regulator are selected to be 0.45 and 1.0, respectively.

The present invention, particularly the deadbeat control corresponding to curve c enables the quickness of response to be greatly improved as compared with the prior art method. Furthermore, the disturbance response which starts when t=6 is identical to that of the prior art method, and the deterioration of the disturbance response is not observed.

Figure 4:
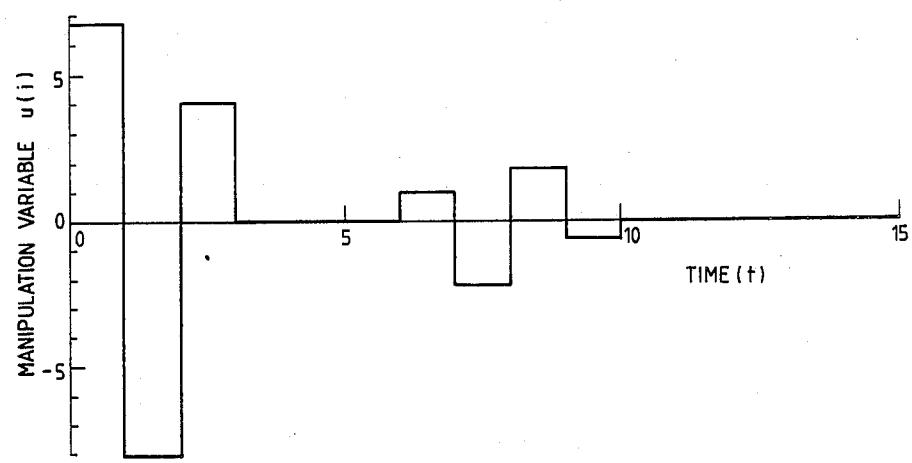
FIG. 4 is a diagram showing the step response containing a step disturbance of the manipulation variable u(t) with the use of the first embodiment.
Figure 5:
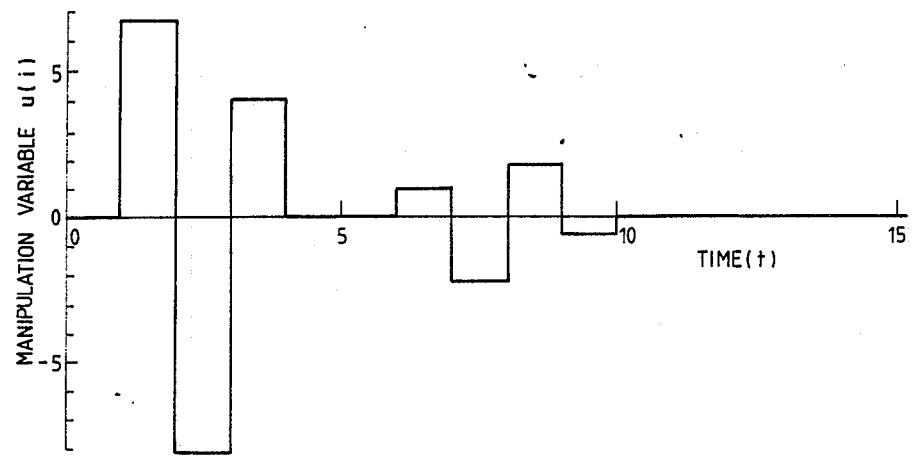
FIG. 5 is a diagram showing a step response containing a step disturbance of the manipulation variable u(t) according to the prior art method similar to the first embodiment.

FIGS. 4 and 5 respectively show the step responses of the manipulation variable 17 (u(i)). FIG. 4 shows the response when the value $k_1$ of the new regulator 9a is 1, while FIG. 5 shows the response when the prior art method (corresponding to $k_1 = 0$) is used. In each of these figures, the horizontal axis represents time (t) and the vertical axis represents manipulation variable u(i)). From a comparison between these figures, it will be appreciated that the response according to the first embodiment of the present invention shown in FIG. 4 is more rapid than that of the prior art method shown in FIG. 5 exactly by one sample time. However, no increase in the value of the manipulation variable is observed.

Embodiment 2

The second embodiment is an application of optimal control which utilizes a type 1 internal model, and will be described with reference to FIG. 2 which has been referred to in the description of the first embodiment. It is assumed that the desired or reference value 1 is represented by equation (3) and that the disturbance 25 is represented by a unit step disturbance which occurs during a time period of $t \geq 20$, that is, $$d(t) = \begin{cases} 0 & (t < 20) \\ 1 & (t \geq 20) \end{cases} \quad (5)$$

The gain controller 14 ($K_1$) and the regulator 23 ($F = (f_1, f_2,$ and $f_3)$) which are combined to provide optimal control are selected in a manner identical to a known method and, theoretically, the values $K_1$ and $F$ can be determined independently of the value $k_1$ of the new regulator 9a and the value $k_1$ can be arbitrarily selected. This is another feature of the present invention which is similar to that of the first embodiment. In order to select the gain controller 14 and the regulator 23 according to the prior art, the following performance criterion for optimal control is employed:

$$J = {}_i\Sigma[Q\{e(i)\}^2 + R\{u(i)\}^2] \quad (6)$$

where e(i) is the sampled and held value of the error 3 and u(i) is the manipulation variable 17. It is found that, for the sample time T=1, the most rapid quickness of response and the best dispersibility of the controlled variable 21 (y(t)) are provided if Q=R=1. Therefore, the gain controller 14 and the regulator 23 are selected by using this value as a specified one.

Figure 6:
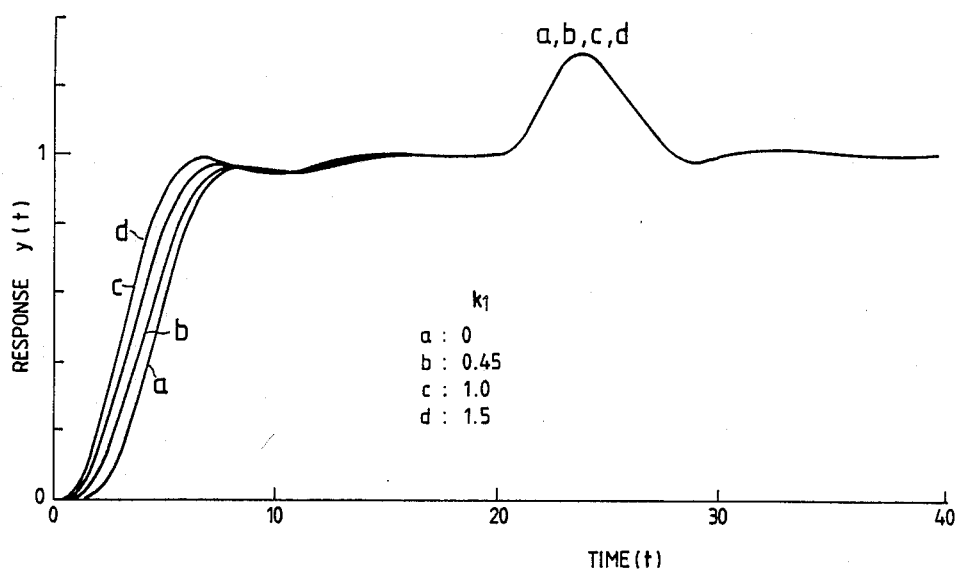
FIG. 6 is a diagram showing step responses according to the second embodiment in contrast to that of a prior art method, each of the step responses containing a step disturbance of the controlled variable y(t)

FIG. 6 shows step responses each containing a step disturbance of the controlled variable 21 (y(t)) in the above-described case, and the horizontal and vertical axes respectively represent time (t) and response y(t). Curve a represents the response of prior art optimal control (corresponding to $k_1 = 0$), and curves b, c and d represent the responses of optimal control according to the present invention when the values $k_1$ of the new regulator 9a are selected to be 0.45, 1.0 and 1.5, respectively. The present invention, particularly the optimal controls corresponding to curves c and d enable the quickness of response to be greatly improved as compared with the prior art method. Furthermore, the disturbance response which starts when t=20 is identical to that of the prior art method, and the deterioration of the disturbance response is not observed.

Figure 7:
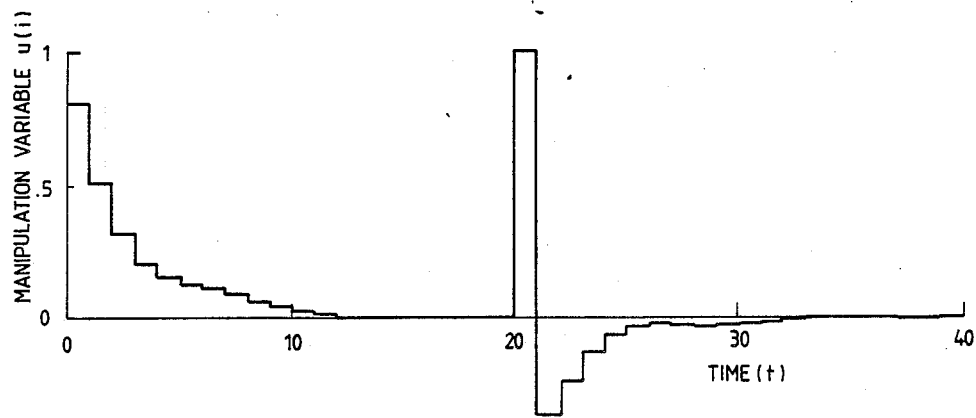
FIG. 7 is a diagram showing the step response containing a step disturbance of the manipulation variable u(t) with the use of the second embodiment.
Figure 8:
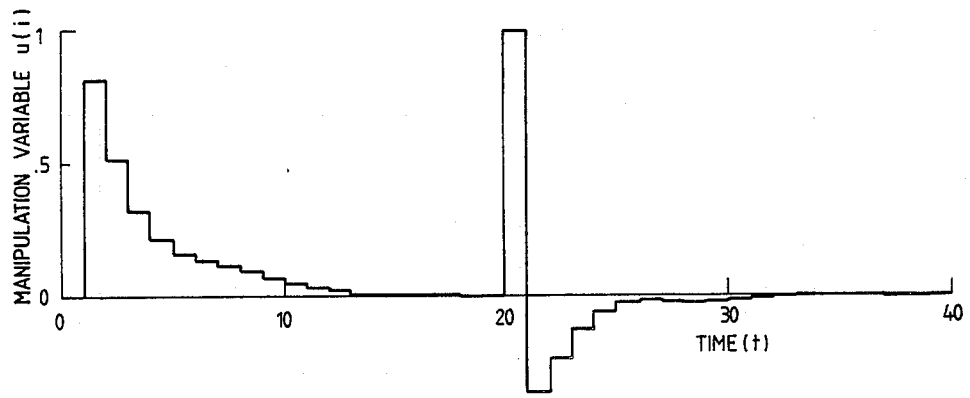
FIG. 8 is a diagram showing a step response containing a step disturbance of the manipulation variable u(t) according to the prior art method similar to the second embodiment.

FIGS. 7 and 8 respectively show the step responses of the manipulation variable 17 (u(i)). FIG. 7 shows the response when the value $k_1$ of the new regulator 9a is 1, while FIG. 8 shows the response when the prior art method is used. In each of these figures, the horizontal axis represents time (t) and the vertical axis represents manipulation variable (u(i)). From a comparison between these figures, it will be appreciated that the response according to the second embodiment of the present invention shown in FIG. 7 is more rapid than that of the prior art method shown in FIG. 8 exactly by one sample time. However, no increase in the value of the manipulation variable is observed.

Embodiment 3

Figure 9:
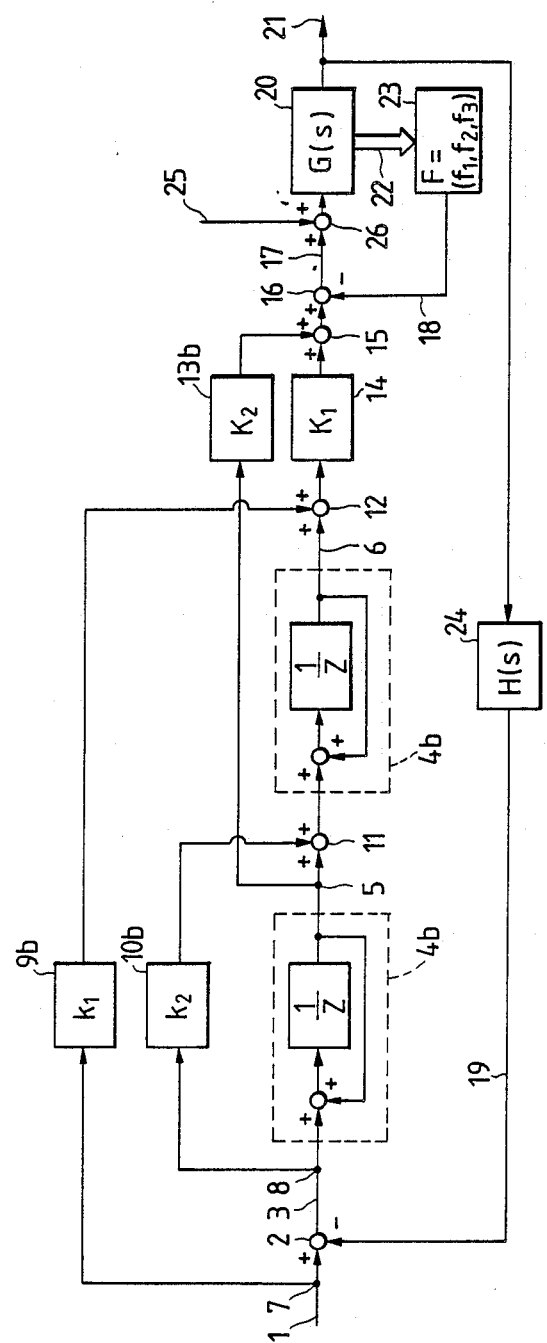
FIG. 9 is a block diagram which serves to illustrate a control mechanism according to a third embodiment of the present invention.

FIG. 9 is a block diagram of the third embodiment in which a new regulator is provided for digital control utilizing the internal model coordination feedforward method according to the present invention, and the third embodiment adopts a deadbeat control mechanism which employs a type 2 internal model. In FIG. 9 in which the same elements as those shown in FIGS. 1 and 2 are identified by the same reference numerals, reference numerals 4b denote two elements such as integrators or similar devices which serve as the internal model; 14 and 13b gain controllers; and 9b and 10b new regulators. The new regulator 9b is inserted between the branch point 7 and the adder 12, and the new regulator 10b is inserted between the branch point 8 and the adder 11. In FIG. 9, an A/D conversion (sample and hold) element and a D/A conversion element are omitted for the sake of simplicity. Also, it is assumed that the desired or reference value 1 is represented by the ramp function:

$$r(t) = \begin{cases} 0 & (t < 0) \\ 0.2t & (t \geq 0) \end{cases} \quad (7)$$

and that the disturbance 25 is a unit step disturbance which occurs during a time period of $t \geq 8$, which disturbance is represented by:

$$d(t) = \begin{cases} 0 & (t < 8) \\ 1 & (t \geq 8) \end{cases} \quad (8)$$

The gain controllers 14 ($K_1$) and 13b ($K_2$) and the regulator 23 (F=($f_1$, $f_2$, and $f_3$)) which are combined to provide deadbeat control are selected in a manner identical to a known method if the value of the new regulator 10b ($k_2$) according to the present invention is given. Also, theoretically, the values $K_1$, $K_2$ and F can be determined independently of the value $k_1$ of the new regulator 9b and the value $k_1$ can be arbitrarily selected. This is another feature of the present invention.

Figure 10:
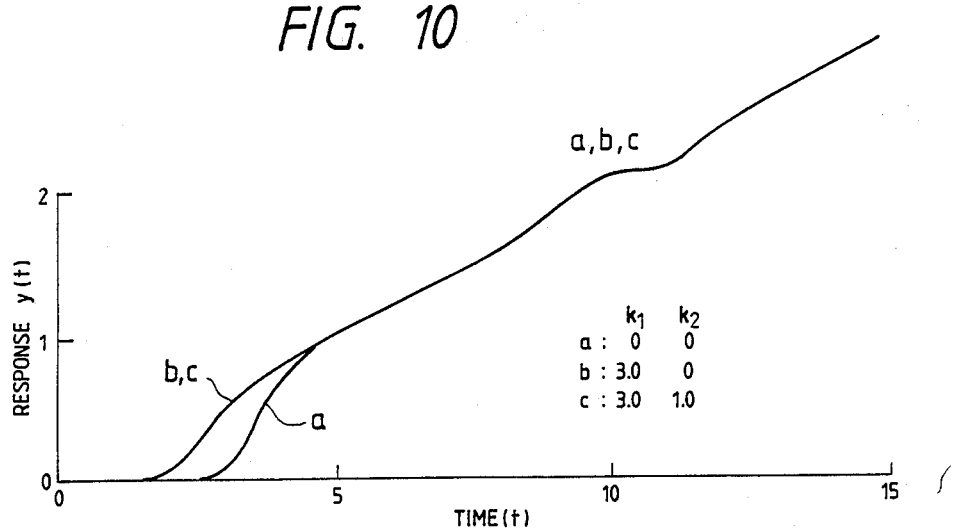
FIG. 10 is a diagram showing ramp responses according to the third embodiment in contrast to that of a prior art method, each of the step responses containing a step disturbance of the controlled variable y(t)

FIG. 10 shows ramp responses each containing a step disturbance of the controlled variable 21 (y(t)) when a sample time is T=1, and the horizontal and vertical axes respectively represent time (t) and response y(t).

Curve a represents the response of prior art deadbeat control (corresponding to $k_1=K_2=0$), and curves b and c represent the responses of deadbeat control according to the present invention when $k_1=3.0$ and $k_2=0$ and when $k_1=3.0$ and $k_2=1.0$, respectively.

If the value $k_2$ of the new regulator 10b is changed, the decision values of all the prior art gain controllers 14 ($K_1$), 13b ($K_2$) and the prior art gain regulators 23 (F=($f_1$, $f_2$, and $f_3$)) correspondingly change. However, it is seen from a comparison between curves b and c that the response of the controlled variable 21 (y(t)) does not change. Although theoretically unknown points remain in this respect, it will be understood that curves b and c for the case of the use of the new regulator according to the present invention show a remarkable improvement in the quickness of response as compared with curve a for the case of the use of the prior art method. Furthermore, the disturbance response which starts when t=8 is maintained at a level identical to that of the prior art method, and no deterioration of the disturbance response is observed.

Figure 11:
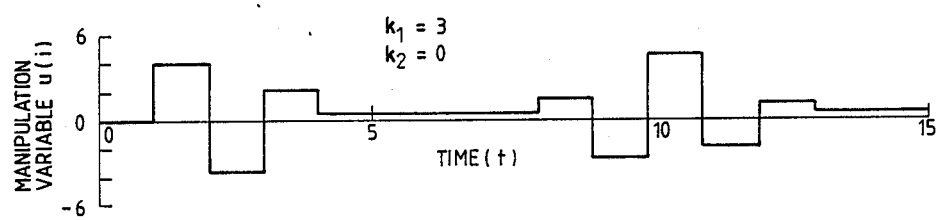
FIG. 11 is a diagram showing the ramp response containing a step disturbance in the manipulation variable u(t) with the use of the third embodiment.
Figure 12:
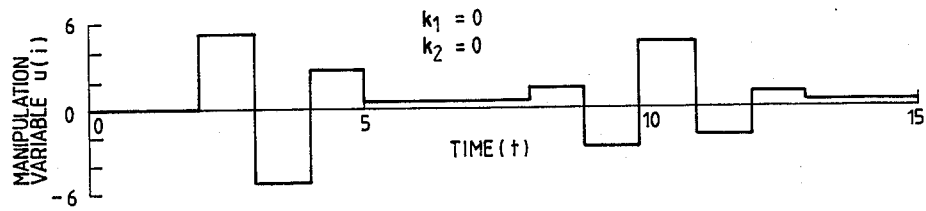
FIG. 12 is a diagram showing a ramp response containing a step disturbance in the manipulation variable u(t) according to the prior art method similar to the third embodiment.

FIGS. 11 and 12 respectively show the step response of the manipulation variable 17 (u(i)). FIG. 11 shows the step response corresponding to curve b according to the present invention, while FIG. 12 shows the step response corresponding to curve a according to the prior art method. In each of these figures, the horizontal axis represents time (t) and the vertical axis represents manipulation variable (u(i)). From a comparison between these figures, it will be appreciated that the response according to the third embodiment of the present invention shown in FIG. 11 is more rapid than that of the prior art method shown in FIG. 12 exactly by one sample time. Furthermore, it is understood that the value of the manipulation variable is small and the characteristics of the manipulation variable improves.

As described above, the control mechanism employing the internal model coordination feedforward method according to each of the embodiments exhibits excellent characteristics in digital control. However, the present inventive control mechanism is likewise applicable to analog control. If the new regulator, which has not conventionally been used, is incorporated into the conventional control mechanism in the above-described manner, it is possible to markedly improve the quickness of response. In addition, the new regulator according to the present invention can be applied to control equipment and control systems of any kind using an internal model, without involving any deterioration in measures against disturbance nor the state of the manipulation variable, and the present invention is advantageous in that the provision of the new regulator does not substantially influence a process for setting conventional gain controllers or regulators by the prior art method.

As described above, the control mechanism according to each of the embodiments may be constructed in the form of a control device, a control IC such as an analog IC or a digital IC, a hardware architecture including a microprocessor or the like as a primary component, or software realized by programming or the like.

The construction of the control mechanism including the new regulator may be modified through the transformation of its block diagram. Furthermore, the present invention is applicable to a construction in which some of the new regulators are omitted.

As described above, the control mechanism employing the internal model coordination feedforward method is applicable to control equipment and control systems of any kind that provides control on the basis of an internal model principle.

What is claimed is:

1. In a control mechanism arranged to obtain a manipulation variable by comparing a desired value or a reference value with a feedback variable into which a controlled variable is transformed to provide an error signal, sequentially transmitting said error signal to an internal model which is composed of the same number of elements as its order, each of said elements including at least a means for storing a state variable, adding the outputs of a plurality of gain controllers into which the state variable of said respective elements are input, and comparing the result of said addition with another feedback variable supplied from a first regulator, said control mechanism employing an internal model coordination feedforward method and comprising:

a second regulator arranged to receive as its input a branched signal of said desired value of said reference value; and means for adding the output of said second regulator to a predetermined state variable of said internal model, an output of said adding means being input to one of said gain controllers.

2. In a control mechanism arranged to obtain a manipulation variable by comparing a desired value or a reference value with a feedback variable into which a controlled variable is transformed to provide an error signal, sequentially transmitting said error signal to an internal model which is composed of the same number of elements as its order, each of said elements including at least a means for storing a state variable, adding the outputs of a plurality of gain controllers into which the state variables of said respective elements are input, and comparing the result of said addition with another feedback variable supplied from a first regulator, said control mechanism employing an internal model coordination feedforward method and comprising:

a plurality of second regulators arranged to receive as their inputs a plurality of branched signals of said error signal;

first means for adding the outputs of said plurality of second regulators to the state variables of said respective elements of said internal model;

an additional additional regulator arranged to receive as its input a branched signal of said desired value or said reference value; and second means for adding the output of said additional regulator to a predetermined state variable of said internal model, an output of said second adding means being input to one of said gain controllers.

3. A control mechanism employing an internal model coordination feedforward method as set forth in claim 1 or 2, wherein said control mechanism is applied to a digital control system such as a system adopting deadbeat control or optimal control.

4. In a control mechanism employing an internal model coordination feedforward method as set forth in claim 1 or 2, said control mechanism being applied to an analog control system.

5. In a control mechanism employing an internal model coordination feedforward method as set forth in claim 1 or 2, said internal model being set up to a type 1 system of a type 2 system.

6. In a control mechanism employing an internal model coordination feedforward method as set forth in claim 2, some of said second regulators being omitted.

7. In a control mechanism employing an internal model coordination feedforward method as set forth in claim 1 or 2, said control mechanism being constructed in the form of at least one of a controller, a control IC such as an analog IC, and a digital IC, hardware architecture including a microprocessor as a primary component, or software realized by programming.

* * * * *